(12) United States Patent
Soliman et al.

(10) Patent No.: US 6,347,283 B1
(45) Date of Patent: Feb. 12, 2002

(54) METHODS FOR COMBINING WELL TEST ANALYSIS WITH WAVELET ANALYSIS

(75) Inventors: Mohamed Soliman, Plano, TX (US); Stanley V. Stephenson, Duncan, OK (US)

(73) Assignee: Halliburton Energy Services, Inc., Dallas, TX (US)

( * ) Notice: Subject to any disclaimer, the term of this patent is extended or adjusted under 35 U.S.C. 154(b) by 0 days.

(21) Appl. No.: 09/612,746

(22) Filed: Jul. 10, 2000

(51) Int. Cl.[7] .................................................. G01V 3/18
(52) U.S. Cl. ......................................................... 702/6
(58) Field of Search ..................... 702/6, 7, 9; 324/338, 324/339; 367/25, 33

(56) References Cited

U.S. PATENT DOCUMENTS 5,550,788 A * 8/1996 Pavone et al. ................ 367/25
5,748,471 A * 5/1998 Grande ........................... 702/6
5,787,050 A * 7/1998 Slevinsky .................... 367/25

OTHER PUBLICATIONS

Patent Application Serial No. 09/538,536, filed Mar. 30, 2000.
*An Introduction to Wavelets*, Amara Graps, 1997.
*Computational Signal Processing with Wavelets*, Anthony Teolis, 1998—pp. 89–126.

* cited by examiner

Primary Examiner—Donald E. McElheny, Jr.
(74) Attorney, Agent, or Firm—John F. Booth; Paul I. Herman

(57) ABSTRACT

The invention provides methods for combining well test analysis with wavelet analysis wherein the use of wavelet analysis with conventionally acquired well data provides verification of the well data. The methods include the steps of acquiring downhole data, converting the data to a first electronic signal, performing wavelet analysis of the first electronic signal to produce a second electronic signal, and using the second electronic signal to aid in the interpretation of the first electronic signal and/or to instigate corrective steps to ensure that the desired parameters of the well environment are accurately represented by the first electronic signal. Some or all of the steps may be performed in real-time.

23 Claims, 4 Drawing Sheets

METHODS FOR COMBINING WELL TEST ANALYSIS WITH WAVELET ANALYSIS

TECHNICAL FIELD

The present inventions relate generally to methods for processing signals obtained by transducers in subterranean wells. More specifically, the inventions relate to the use of wavelet analysis in improved methods of obtaining and processing signals relating to physical parameters downhole derived from downhole transducers.

BACKGROUND OF THE INVENTION

It is known to measure various physical parameters of the subterranean environment of an oil or gas well. Physical parameters such as pressure and temperature are commonly converted into electronic signals with downhole transducers. Such signals can be analyzed for making decisions regarding the operation of the well.

One example of a common type of well test is known as a build-up test. In a build-up test a pressure transducer is introduced into the well and the well is temporarily sealed. The build-up of pressure is monitored and the information obtained is often used to make operational decisions relating to production and further development of the well.

Conventional systems, using for example quartz piezoelectric transducers, are subject to errors caused by static and dynamic pressure and temperature induced errors. No matter how well designed, the output signal or data from a quartz pressure transducer is affected by the temperature of the pressure sensing piezoelectric element, and the data from a temperature sensing quartz element is effected by pressure. It is common to calibrate (correct) pressure data as a function of temperature data collected at or near the pressure-measuring site. Substantial computation is required in order to convert and correct the output into an intelligible form.

Complicating matters, oftentimes transducer signals can also be affected by interference caused by the operation of well tools, changes in the downhole environment by the opening or closing of valves, or a number of other causes. Using conventional analysis techniques it is often unknown whether a particular data signal is valid until a significant time interval has elapsed. Additionally, using conventional techniques, when data is determined to be flawed, it is often impossible to determine whether an entire data signal is flawed or only isolated portions of the data. Generally, it is impossible to extract useful information from data known to be flawed.

Despite recent advances in the making and use of downhole transducers to gather data relating to physical parameters relating to the downhole environment, due to the above-mentioned problems with current data collection and analysis techniques, attempts to measure downhole conditions sometimes fail. For example, with state-of-the-art equipment and methods, it is possible to conduct a pressure build-up test in its entirety before discovering upon further analysis that the test was flawed. Much time and expense can be wasted in analyzing and reproducing tests before errors are discovered and in retesting after the discovery of errors.

SUMMARY OF INVENTION

Generally, the present invention is directed to providing improved methods of analysis of downhole test data capable of providing almost instantaneous indications of not only the test parameters, but also the presence or absence of error conditions. The new analysis methods provide a useful verification of well data collection efforts. The new analysis methods also provide new alternative methods of recording or reconstructing well data. The real-time aspect of the invention is extremely advantageous in that it provides feedback useful for real-time correction of error conditions.

The invention provides methods for combining well test analysis with wavelet analysis. The use of wavelet analysis with a conventionally acquired well data signal provides verification of the well data signal. The methods of the invention include the steps of acquiring downhole data, converting the data to a first electronic signal, performing wavelet analysis of the first electronic signal to produce a second electronic signal, and using the second electronic signal to aid in the interpretation of the first electronic signal and to instigate physical feedback into the well environment.

According to one aspect of the invention, the wavelet analysis is performed using a Daubechies wavelet.

According to another aspect of the invention, the wavelet analysis is performed using a Daubechies 10 wavelet.

According to still another aspect of the invention, the wavelet analysis is performed using a Daubechies 1 wavelet to produce the first derivative of the first electronic signal with respect to time.

According to another aspect of the invention, the wavelet analysis is performed in real-time.

According to yet another aspect of the invention, all of the steps are performed in real-time.

According to other aspects of the invention, based upon the information contained in the second electronic signal, steps are taken to influence physical conditions in the well environment, subsequently affecting the first electronic signal.

According to an additional aspect of the invention, the added step of reconstructing the first electronic signal from the second electronic signal is performed.

According to other aspects of the invention, the methods are employed to measure downhole well pressure.

According to other aspects of the invention, the methods are employed to perform well tests such as build-up, interference, drawdown or pulse tests.

BRIEF DESCRIPTION OF DRAWINGS

The accompanying drawings are incorporated into and form a part of the specification to illustrate several examples of the present inventions. These drawings together with the description serve to explain the principals of the inventions. The drawings are only for the purpose of illustrating preferred and alternative examples of how the inventions can be practiced and used and are not to be construed as limiting the inventions to only the illustrated and described examples. The various advantages and features of the present inventions will be apparent from a consideration of the drawings in which.

DETAILED DESCRIPTION

Figure 1:
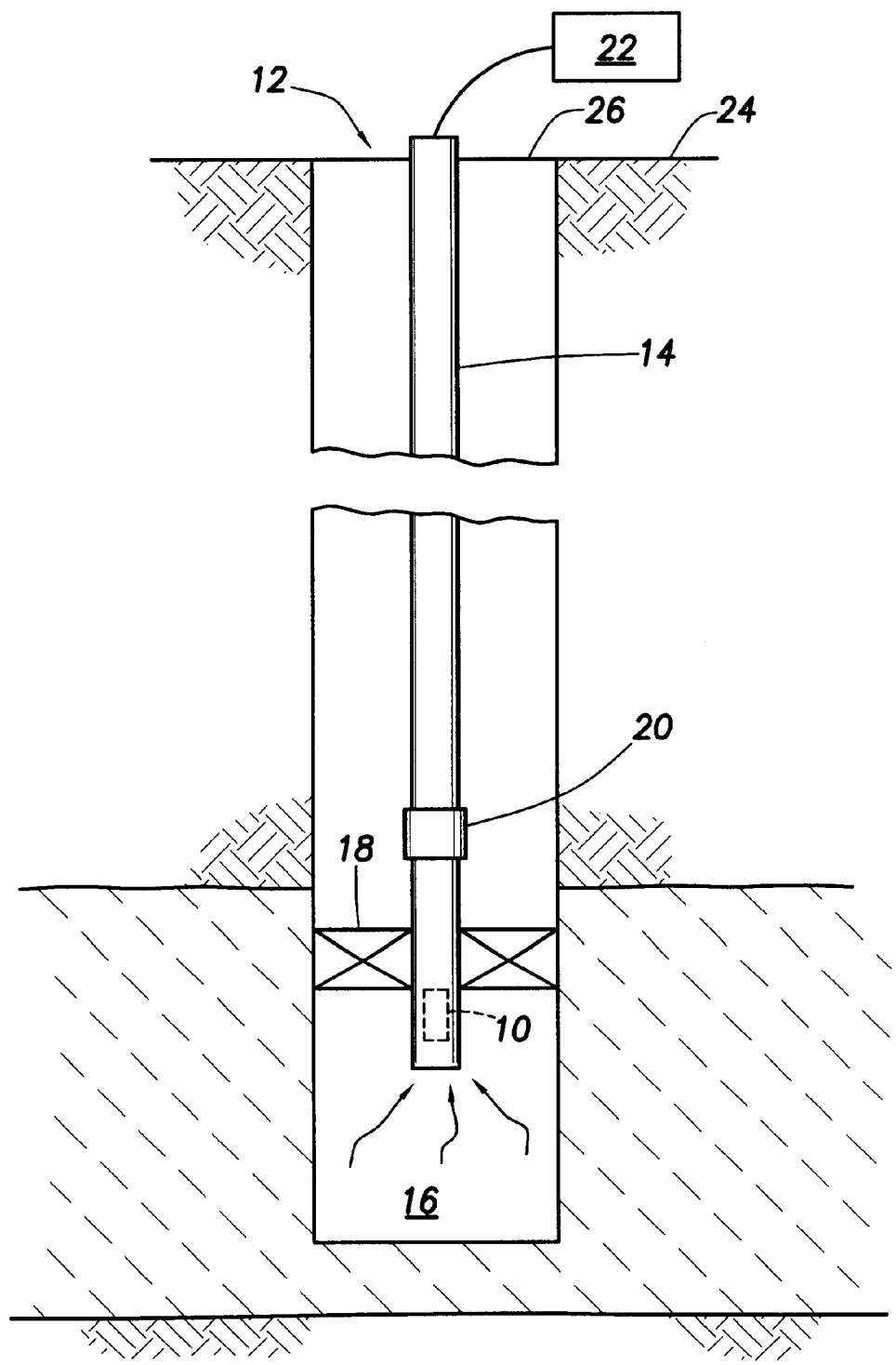
FIG. 1 depicts a lateral cross sectional view of a subterranean oil or gas well as an example of how the invention may be practiced.

The present inventions are described by reference to drawings showing one or more examples of how the inventions can be practiced and used. In these drawings, reference characters are used throughout the several views to indicate like or corresponding parts or steps.

In the description which follows, like or corresponding parts are marked throughout the specification and drawings with the same reference numerals, respectively. The drawings are not necessarily to scale and the proportions of certain parts have been exaggerated to better illustrate details and features of the invention. In the following description, the term "downhole", as used herein, shall mean in relation to the bottom, or furthest extent of, the surrounding wellbore even though the wellbore or portions of it may be deviated or horizontal. The term "real-time" as used herein means a time frame in which the occurrence of an event and the reporting or analysis of it are almost simultaneous; e.g., within a maximum duration of not more than two periods of a particular signal being operated upon.

Where components of relatively well-known design are employed, their structure and operation will not be described in detail. An example of the type of transducer assembly discussed herein is disclosed in U.S. patent application, Ser. No. 09/538,536, which is assigned to the assignee of this application, and is incorporated for all purposes herein by this reference.

Referring now to FIG. 1, the invention is practiced by acquiring one or more data signals relating to one or more downhole physical parameters in the conventional manner. It should be understood that the invention may be practiced with any test such as an interference test, build-up test, drawdown test or other test on measurement wherein data or signals are to be analyzed concerning one or more downhole physical parameters. For example, a temperature compensated pressure transducer 10 is inserted into a well 12. The transducer 10 is lowered into the well casing 14 and positioned in the downhole environment 16 where the physical parameter, in this example pressure, is to be determined. Conventionally, the transducer is located in a downhole environment 16 that is sealed off with packing 18 wherein access is controlled with a valve 20. The targeted physical parameter is detected by the transducer 10 and converted to a first electronic signal by the transducer and associated electronics electrically connected to the transducer. The first electronic signal is transmitted through a wire or wireless connection to a signal processor unit 22, preferably located above the surface 24 at the wellhead 26. The signal processor unit 22 performs mathematical operations on the first electronic signal further described with reference to FIGS. 2–4.

Figure 2:
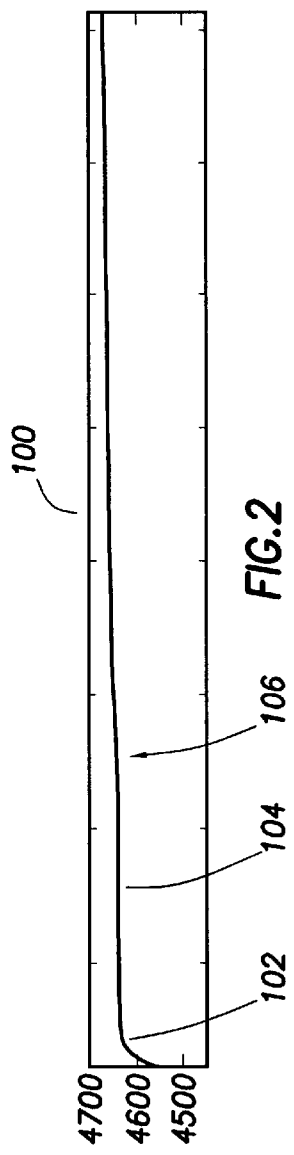
FIG. 2 is a graphical representation of a pressure signal acquired from a subterranean or gas well with a transducer.

FIG. 2 is a graphical representation of a first electronic signal 100 resulting from a pressure reading using a pressure transducer as described above with reference to FIG. 1. The first electronic signal 100 depicted in FIG. 2 is representative of those known in the art and includes one particular anomaly further discussed below. The electronic signal 100 has several features further described as follows. A first portion 102 of the signal 100 indicates a delay in response as the system begins to collect data, which does not reveal information concerning the downhole environment. A first data segment 104 then follows, terminating at point 106. A second data segment 108 then follows until the termination of the signal. It should be clear from the plot of FIG. 2 that a change in the signal occurred to create anomalous point 106 and resulting distinct segments 104 and 108. Using conventional techniques, it cannot be determined whether point 106 is a result of actual physical conditions downhole, or whether point 106 is a result of erroneous data during segments 104 or 108, or at point 106 only.

Figure 3:
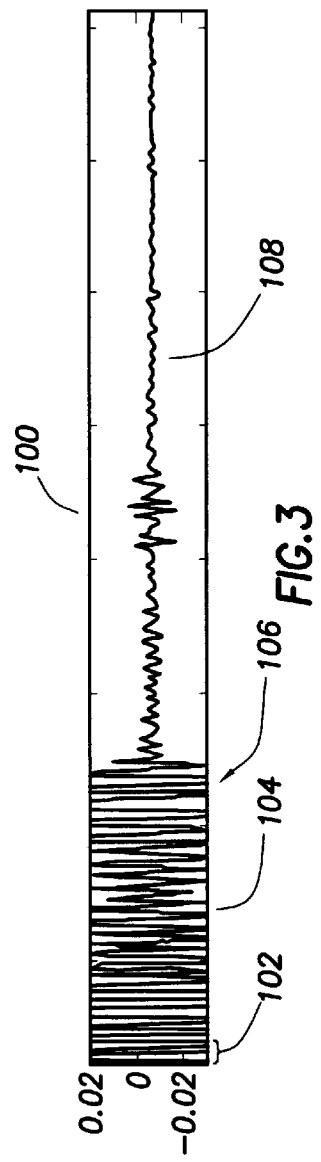
FIG. 3 is a graphical representation of data obtained after applying Daubechies 10 wavelet analysis to the data of FIG. 2.

Now referring to FIG. 3 in relation to FIG. 2, the nature of the anomaly at point 106 can be determined by using wavelet analysis as follows. A wavelet transform may be performed on the first signal, preferably in real-time. Preferably a Daubechies 10 wavelet is used, although any of Daubechies 2 through Daubechies 10 wavelets or other compactly supported orthonormal wavelets may also be used. In FIG. 3, 100 denotes a plot of a second signal generated by computing the Daubechie 10 wavelet of the first signal. The first portion of signal 100 of FIG. 3, denoted by 102 corresponds to 102 of FIG. 2. Similarly, the numerals 104, 106, and 108 of FIG. 3 correspond to the numerals of FIG. 2. FIG. 3 represents a high resolution plot of the noise identified by taking the wavelet transform of the first signal of FIG. 2. Thus, it can be seen from FIG. 3 that the data of sections 102 and 104 of FIG. 2 was subject to a pattern of noise undetectable in that figure, and that a physical change is indicated at point 106, whereafter the noise was greatly attenuated.

Figure 4:
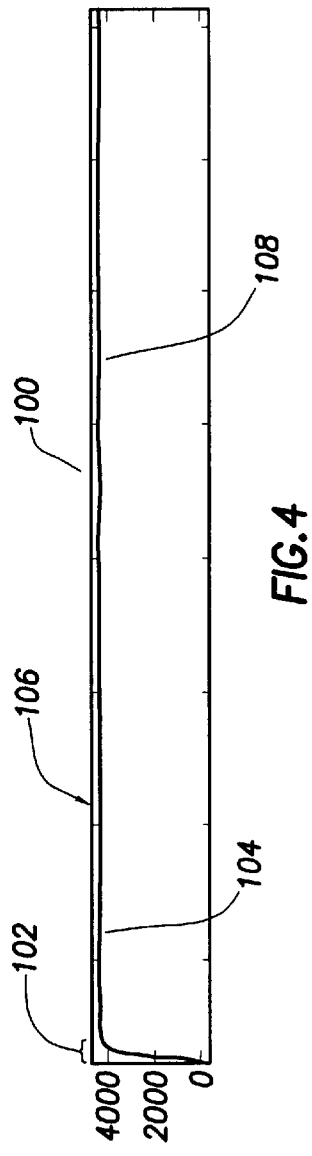
FIG. 4 is a reconstruction of the signal of FIG. 2 after applying an inverse wavelet transform to the data of FIG. 3.

FIG. 4 depicts a plot of a reconstruction of the data of FIG. 2 after the removal of the known noise components of FIG. 3, providing a representation of an idealized first signal. Thus, the inverse wavelet transform may also be used to provide a check on the data collection effort giving rise to FIG. 2.

The advantage of using the information from the wavelet analysis described and depicted in FIG. 3 to adjust the well test conditions in real time should be clear. Under the conventional practice, a lengthy pressure test and cumbersome post-test analysis on unconfirmed data are required wherein errors may become evident only after extensive post-test analysis. Under the disclosed method, real-time information is available for taking immediate steps to ensure the collection of useful data, such as for example opening or closing a valve, or activating or deactivating well machinery. Such steps taken to conform the downhole environment to the environment intended to be measured will be referred to herein as "enviromunentally corrective".

Figure 5:
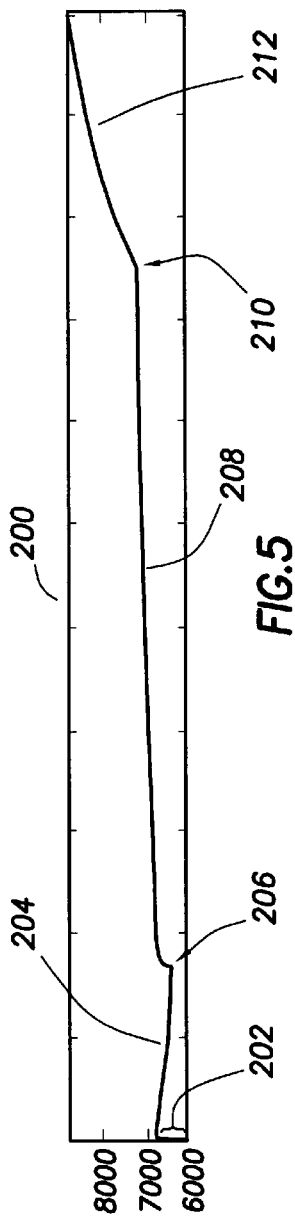
FIG. 5 is a graphical representation of a different pressure signal taken from a subterranean oil or gas well during a build-up test.

Referring now to FIG. 5 another example of a first signal, taken with a pressure transducer during a build-up test, is represented by plot 200. The plot has a beginning portion 202 indicative of the response time of the measuring system, which can be disregarded. A first data segment 204 then follows, terminating at point 206. A second data segment 208 then follows until a change at point 210, followed by a third data segment 212 until the termination of the signal. It is known from the circumstances of the collection of the data depicted in FIG. 4 that the well was producing during first data segment 204 and that production was stopped at point 206 commencing the build-up test. Second data segment 208 shows the increase of pressure over time. The change at point 210 is a result of a change in the scale of the x-axis, representing time, as will be further discussed below, and third data segment 212 represents the continued build-up of pressure.

Although FIG. 5 is representative of a typical build-up test, using conventional techniques it cannot be confirmed whether the plot of FIG. 5 is representative of actual physical conditions downhole or whether erroneous data is simply distributed in such a way as to mask any errors and produce an apparently normal result.

Figure 6:
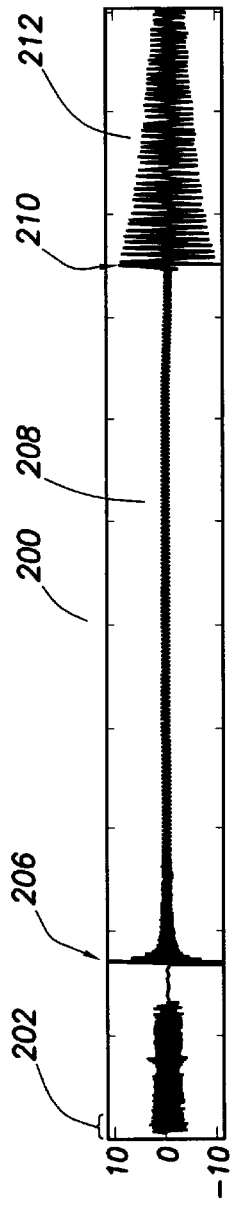
FIG. 6 is a graphical representation of data obtained after applying Daubechies 1 wavelet analysis to the data of FIG. 4.

The first signal of FIG. 5 may be operated upon with the Daubechies 1 wavelet to produce a second signal depicted in FIG. 6, preferably in real-time, consisting of the first derivative of the first electronic signal with respect to time. Now referring to FIG. 5 in relation to FIG. 6, the analysis of the first and second signals with respect to one another gives a real-time indication of the validity of the first data signal of FIG. 5. Note that the numerals designated "n'" in the derivative signal of FIG. 6 correspond to the features with like numerals in FIG. 5. As can be seen in FIG. 6, the peak-to-peak amplitude of the Daubechies 1 wavelet analysis gives the slope of the signal depicted in FIG. 5. It should be clear to those skilled in the art that scale changes such as that shown at 210 may be made as needed to provide the desired level of resolution. The derivative 200' (FIG. 6) of the signal 200 (FIG. 5) in this example provides real-time verification that the data of FIG. 5 increases in a consistent manner with no inexplicable anomalies or spurious data. This calculated derivative may be multiplied by time to produce a plot of change in pressure as a function of time similar to that provided by conventional methods. The derivative calculation method of the invention is far more accurate and has the added advantage of avoiding the use of a "smoothing window." The use of a smoothing window in conventional methods tends to smear the shape of the resulting curve and may obscure important characteristics.

Figure 7:
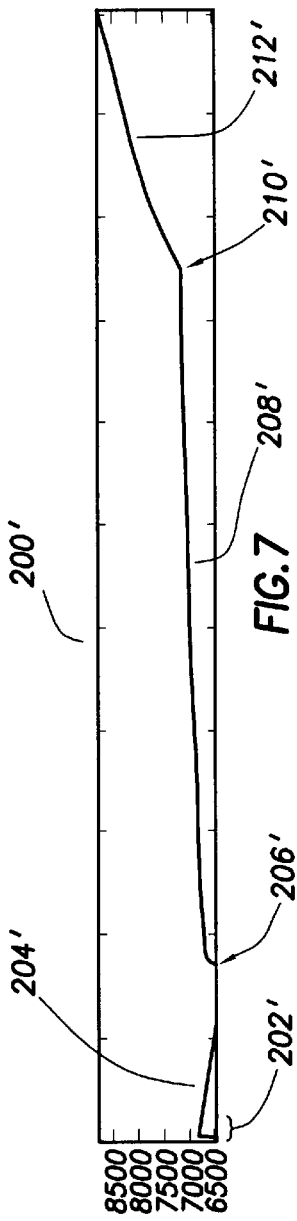
FIG. 7 is a reconstruction of the signal of FIG. 5 after applying an inverse wavelet transform to the data of FIG. 6.

FIG. 7 depicts a reconstruction of signal 5 from signal 6 through the use of an inverse wavelet transform known in the arts. Direct comparison of FIG. 5 with FIG. 7 may also be used to verify the validity of the data of FIG. 5.

The advantage of the disclosed technique for producing a real-time derivative of a signal such as that of FIG. 5 should be evident. Rather than perform a lengthy build-up test and cumbersome post-test analysis on unconfirmed data as under the conventional practice, the test may be modified by environmentally corrective action or discontinued and restarted at any instant if erroneous data is indicated. This can result in a substantial savings of time, effort and expense.

The disclosed methods also have the advantage of providing a second data signal from which the idealized test data can be reconstructed, or from which the noise data can be analyzed. This result may be used for redundant data storage, or data compression, by retaining only the wavelet analysis data and using it to reconstruct the any or all of the other plots as desired.

Figure 8:
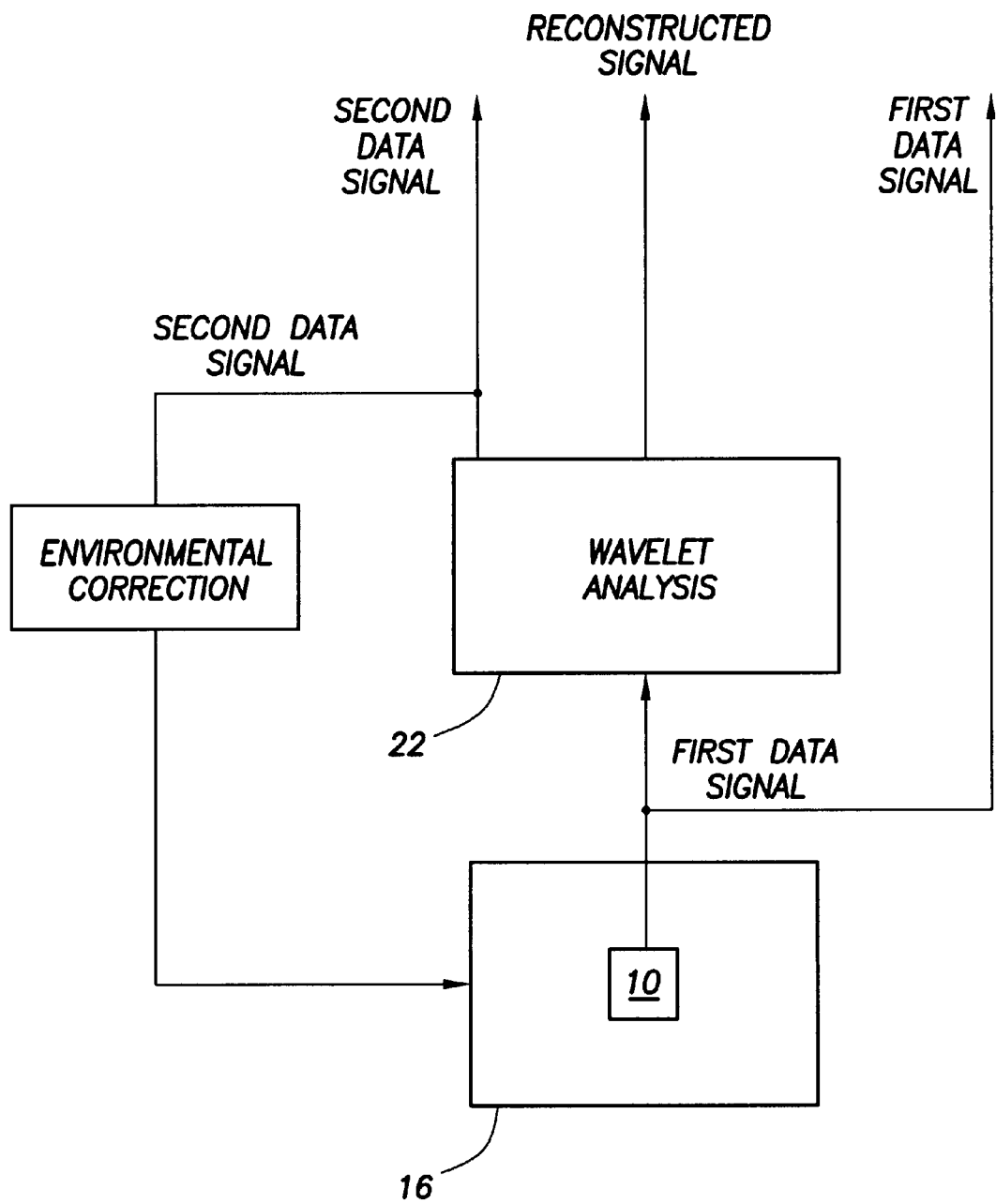
FIG. 8 is a block diagram of the methods of FIGS. 1–7.

With reference to FIG. 8, the following general description is given as another illustration of the method of practicing the invention discussed with reference to FIGS. 1–7. The downhole environment 16 exhibits one or more physical characteristics, which are converted into one or more first electronic signals by a transducer 10 placed downhole. The first electronic signal is conveyed to the signal processor unit 22 via a wire or wireless electrical connection. The signal processing unit 22 includes circuitry configured in a manner known in the art to perform one or more wavelet transforms on the first electronic signal producing a second electronic signal. The signal processing unit 22 may include conventional microelectronics, general purpose computers, special purpose signal processing hardware, software, or firmware, or a combination thereof, to perform the required mathematical operations. As described with reference to FIGS. 2–7, the output of the signal processing unit may be used for comparative analysis, signal reconstruction, or feedback indicating a need for environmentally corrective intervention in the downhole environment.

The embodiments shown and described above are only exemplary. Many details are often found in the art such as: downhole sensors including transducers and the like. Therefore, many such details are neither shown nor described. It is not claimed that all of the detail, parts, elements, or steps described and shown were invented herein. Even though numerous characteristics and advantages of the present inventions have been set forth in the foregoing description, together with details of the methods and function of the inventions, the disclosure is illustrative only, and changes may be made in the detail, especially in matters of shape, size and arrangement of the parts within the principles of the inventions to the full extent indicated by the broad general meaning of the terms used in the attached claims. The restrictive description and drawings of the specific examples above do not point out what an infringement of this patent would be, but are to provide at least one explanation of how to make and use the inventions. The limits of the inventions and the bounds of the patent protection are measured by and defined in the following claims.

What is claimed is:

1. A method for determining physical properties within a subterranean well comprising the steps of:
   obtaining a first electronic signal representative of one or more physical parameters of the environment in a subterranean well;
   in real time, performing wavelet analysis of the first electronic signal to produce a second electronic signal; and
   interpreting the first electronic signal with reference to the second electronic signal.

2. The method for determining physical properties within a subterranean well according to claim 1 wherein
   the step of performing wavelet analysis of the first electronic signal comprises using a Daubechies wavelet function to produce the second electronic signal.

3. The method for determining physical properties within a subterranean well according to claim 1 wherein
   the step of performing wavelet analysis of the first electronic signal comprises using a Daubechies 10 wavelet function to produce the second electronic signal.

4. The method for determining physical properties within a subterranean well according to claim 1 wherein
   the step of performing wavelet analysis of the first electronic signal comprises using a Daubechies 1 wavelet function to produce a second electronic signal representing the first derivative of the first electronic signal with respect to time.

5. The method for determining physical properties within a subterranean well according to claim 1 comprising the further step of
   taking environmentally corrective action based on the second electronic signal to ensure that the first electronic signal is representative of the physical properties desired to be measured.

6. The method for determining physical properties within a subterranean well according to claim 1 wherein
   all of the steps are performed in real-time.

7. The method for determining physical properties within a subterranean well according to claim 1 comprising the further step of using wavelet analysis to reconstruct the first electronic signal from the second electronic signal.

8. A method for determining pressure properties within a subterranean well comprising the steps of:

obtaining a first electronic signal representative of one or more pressure parameters of the environment in a subterranean well;

performing wavelet analysis of the first electronic signal to produce a second electronic signal; and interpreting the first electronic signal with reference to the second electronic signal.

9. The method for determining pressure properties within a subterranean well according to claim 8 wherein the step of performing wavelet analysis of the first electronic signal comprises using a Daubechies wavelet function to produce the second electronic signal.

10. The method for determining pressure properties within a subterranean well according to claim 8 wherein the step of performing wavelet analysis of the first electronic signal comprises using a Daubechies 10 wavelet function to produce the second electronic signal.

11. The method for determining pressure properties within a subterranean well according to claim 8 wherein the step of performing wavelet analysis of the first electronic signal comprises using a Daubechies 1 wavelet function to produce a second electronic signal representing the first derivative of the first electronic signal with respect to time.

12. The method for determining pressure properties within a subterranean well according to claim 8 comprising the further step of taking environmentally corrective action based on the second electronic signal to ensure that the first electronic is representative of downhole well pressure properties.

13. The method for determining pressure properties within a subterranean well according to claim 8 wherein the step of performing wavelet analysis of the first electronic signal to produce a second electronic signal is performed in real-time.

14. The method for determining pressure properties within a subterranean well according to claim 8 wherein all of the steps are performed in real-time.

15. The method for determining pressure properties within a subterranean well according to claim 8 comprising the further step of using wavelet analysis to reconstruct the first electronic signal from the second electronic signal.

16. A method for performing a test within a subterranean well comprising the steps of:

obtaining a first electronic signal representative of one or more pressure parameters of the environment in a subterranean well;

performing wavelet analysis of the first electronic signal to produce a second electronic signal; and interpreting the first electronic signal with reference to the second electronic signal.

17. The method for performing a test within a subterranean well according to claim 16 wherein the step of performing wavelet analysis of the first electronic signal comprises using a Daubechies wavelet function to produce the second electronic signal.

18. The method for performing a test within a subterranean well according to claim 16 wherein the step of performing wavelet analysis of the first electronic signal comprises using a Daubechies 10 wavelet function to produce the second electronic signal.

19. The method for performing a test within a subterranean well according to claim 16 wherein the step of performing wavelet analysis of the first electronic signal comprises using a Daubechies 1 wavelet function to produce a second electronic signal representing the first derivative of the first electronic signal with respect to time.

20. The method for performing a test within a subterranean well according to claim 16 comprising the further step of taking environmentally corrective action based on the second electronic signal to ensure that the first electronic signal is representative of one or more well pressure parameter.

21. The method for performing a test within a subterranean well according to claim 16 wherein the step of performing wavelet analysis of the first electronic signal to produce a second electronic signal is performed in real-time.

22. The method for performing a test within a subterranean well according to claim 16 wherein all of the steps are performed in real-time.

23. The method for performing a test within a subterranean well according to claim 16 comprising the further step of:

using wavelet analysis to reconstruct the first electronic signal from the second electronic signal.

* * * * *